US009830749B2

(12) United States Patent
Mitchell et al.

(10) Patent No.: US 9,830,749 B2
(45) Date of Patent: *Nov. 28, 2017

(54) SYSTEMS AND METHODS FOR EXECUTING CUSTOM FLEET VEHICLE MANAGEMENT SCRIPTS

(71) Applicant: Telogis, Inc., Aliso Viejo, CA (US)

(72) Inventors: David John Mitchell, Austin, TX (US); Ralph James Mason, Christchurch (NZ)

(73) Assignee: Telogis, Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/332,846

(22) Filed: Oct. 24, 2016

(65) Prior Publication Data
US 2017/0154478 A1 Jun. 1, 2017

Related U.S. Application Data

(63) Continuation of application No. 14/921,696, filed on Oct. 23, 2015, now Pat. No. 9,478,076.

(Continued)

(51) Int. Cl.
G07C 5/00 (2006.01)
H04W 4/04 (2009.01)
B60R 16/02 (2006.01)
G07C 5/08 (2006.01)
G08G 1/00 (2006.01)
B60R 16/023 (2006.01)
H04L 29/06 (2006.01)
H04L 29/08 (2006.01)

(52) U.S. Cl.
CPC ............ *G07C 5/008* (2013.01); *B60R 16/023* (2013.01); *G07C 5/085* (2013.01); *G08G 1/20* (2013.01); *H04L 63/0428* (2013.01); *H04L 63/08* (2013.01); *H04L 63/107* (2013.01); *H04L 67/12* (2013.01); *H04W 4/046* (2013.01); *H04L 2209/84* (2013.01)

(58) Field of Classification Search
CPC ...... G07C 5/008; G07C 5/085; B60R 16/023; H04L 63/107; H04L 63/08; H04L 63/0428; H04L 67/12; H04L 2209/84; H04W 4/046; G08G 1/20
See application file for complete search history.

(56) References Cited

U.S. PATENT DOCUMENTS 8,327,451 B2   12/2012  Duri et al.
8,650,098 B2 *  2/2014  Rangel ................ G06Q 10/087
                                                        340/988

(Continued)

OTHER PUBLICATIONS

"Programmable Event Generator", Peg On-board Intelligence CalAmp, http://www.calamp.com/products/peg, accessed Oct. 16, 2014, 2 pages.

(Continued)

*Primary Examiner* — Thomas Ingram

(57) ABSTRACT

System and methods are disclosed for gathering vehicle data from a vehicle engine computer installed in an engine of a vehicle and a plurality of sensors disposed about the vehicle and providing functionality for a third-party to install and then execute custom scripts within a telematics application to change default functionalities of the telematics application when processing the vehicle data.

19 Claims, 4 Drawing Sheets

Related U.S. Application Data

(60) Provisional application No. 62/068,246, filed on Oct. 24, 2014.

(56) References Cited

U.S. PATENT DOCUMENTS

| | | |
|---|---|---|
| 8,848,608 B1 | 9/2014 | Addepalli et al. |
| 8,918,251 B2 | 12/2014 | Tarnutzer et al. |
| 2003/0117298 A1 | 6/2003 | Tokunaga et al. |
| 2010/0198427 A1 | 8/2010 | Fogelstrum et al. |
| 2012/0158211 A1* | 6/2012 | Chen .................. G08G 1/0112 701/1 |
| 2013/0317668 A1 | 11/2013 | Tarnutzer |
| 2014/0111354 A1* | 4/2014 | Hergesheimer .......... H04Q 9/00 340/870.02 |
| 2014/0142886 A1* | 5/2014 | Hergesheimer ......... G01P 15/18 702/141 |

OTHER PUBLICATIONS

"Provisioning/Programming, Update, and Logistical System", PULS Remote Management CalAmp, http://www.calamp.com/products/puls, accessed Oct. 16, 2014, 2 pages.

* cited by examiner

SYSTEMS AND METHODS FOR EXECUTING CUSTOM FLEET VEHICLE MANAGEMENT SCRIPTS

RELATED APPLICATIONS

Any and all applications, if any, for which a foreign or domestic priority claim is identified in the Application Data Sheet of the present application are hereby incorporated by reference under 37 CFR 1.57.

BACKGROUND

A vehicle management system and in-vehicles devices can be used to assist in planning and servicing routes of a fleet of vehicles.

SUMMARY

In some embodiments, a system is disclosed for gathering vehicle data from a vehicle engine computer installed in an engine of a vehicle and a plurality of sensors disposed about the vehicle and providing functionality for a third-party to install and then execute custom scripts within a telematics application to change default functionalities of the telematics application when processing the vehicle data. The system can include: an electronic device including digital logic circuitry and configured to be installed in a vehicle, the electronic device including a port configured to couple with a vehicle engine computer installed in an engine of the vehicle and have wired or wireless connections with a plurality of sensors disposed about the vehicle; and a first memory device in communication with the electronic device, the first memory device storing a telematics application that when executed by the electronic device causes the electronic device to gather vehicle data received from the vehicle engine computer and the plurality of sensors and determine vehicle events for the vehicle. The vehicle data can include (i) location data providing geographic locations of the vehicle while the vehicle travels a route and (ii) speed data providing traveling speeds of the vehicle while the vehicle travels the route. The vehicle events can include (i) a hard braking by the vehicle during which the vehicle experiences more than a threshold deceleration or (ii) a hard acceleration by the vehicle during which the vehicle experiences more than a threshold acceleration. The electronic device can be configured to: while the vehicle travels the route, execute the telematics application causing the electronic device to gather the vehicle data, determine the vehicle events, and transmit at least some of the vehicle data and at least some of the vehicle events to a vehicle management system; subsequent to the vehicle traveling the route, receive and store in a second memory device a custom script executable in the telematics application, the telematics application being configured to interpret the custom script; retrieve the custom script from the second memory device; and while executing the telematics application, execute the custom script in the telematics application to change a default functionality of the telematics application so that the telematics application causes the electronic device to control operation of a component associated with the vehicle differently than if the telematics application is executed without executing the custom script in the telematics application.

The system of the preceding paragraph can included one or more of the following features: The custom script can include instructions for the telematics application to perform a plurality of custom operations. The electronic device can be configured to receive the custom script from an individual other than a manufacturer of the vehicle or a manufacturer of the electronic device. The instructions can include event determination instructions which when executed in the telematics application cause the electronic device to: determine an occurrence of an event from the vehicle data according to the event determination instructions; and output an indication of the event for presentation to a driver of the vehicle or to the vehicle management system. The instructions can include data analysis instructions which when executed in the telematics application cause the electronic device to: analyze the vehicle data according to the data analysis instructions to generate analysis data; and output the analysis data for presentation to a driver of the vehicle or to the vehicle management system. Subsequent to executing the custom script in the telematics application, the electronic device can be configured to execute the telematics application without executing the custom script in the telematics application so that the default functionality of the telematics application is not changed. The electronic device can be configured to: in response to receiving a first user input indicating to enable execution of the custom script in the telematics application, execute the custom script in the telematics application; and in response to receiving a second user input indicating to disable execution of the custom script in the telematics application, execute the telematics application without executing the custom script. When the electronic device executes the custom script in the telematics application, the custom script can receive the vehicle data from the telematics application rather than directly receiving the vehicle data from the vehicle engine computer and the plurality of sensors. The component can include a sensor of the plurality of sensors, and the electronic device can be configured to execute the custom script in the telematics application to change the default functionality of the telematics application so that the telematics application causes the electronic device to control operation of the sensor to adjust a configuration of the sensor. The component can include a transmitter, and the electronic device can be configured to execute the custom script in the telematics application to change the default functionality of the telematics application so that the telematics application causes the electronic device to control operation of the transmitter to complete a data service call. When the electronic device executes the custom script in the telematics application, the custom script can be enabled to adjust a functionality of the telematics application when the telematics application processes a first set of the vehicle data and may not be enabled to adjust the functionality of the telematics application when the telematics application processes a second set of the vehicle data. When the electronic device executes the custom script in the telematics application, the custom script can be enabled to adjust a functionality of the telematics application when the telematics application performs a first operation on the vehicle data and may not be enabled to adjust the functionality of the telematics application when the telematics application performs a second operation on the vehicle data. When the electronic device executes the custom script in the telematics application, the telematics application can perform a first operation not initiated by the custom script with a higher priority than a second operation initiated by the custom script. The custom script can include JavaScript™ code. In response to determining that the custom script is provided by an unauthenticated user or that the custom script is provided with unexpected authentication information, the electronic device can be configured to not store the custom script in the second memory device or execute the custom script in the telematics application. The electronic device can be configured to receive the custom script from a device via a wireless communication network.

In some embodiments, a method is disclosed for gathering vehicle data from a vehicle engine computer installed in an engine of a vehicle and a plurality of sensors disposed about the vehicle and providing functionality for a third-party to install and then execute custom scripts within a telematics application to change default functionalities of the telematics application when processing the vehicle data. The method can include: under control of an electronic device including digital logic circuitry and installed in a vehicle, the electronic device including a port coupled with a vehicle engine computer installed in an engine of the vehicle and having wired or wireless connections with a plurality of sensors disposed about the vehicle: while the vehicle travels a route, executing a telematics application causing the electronic device to gather vehicle data received from the vehicle engine computer or the plurality of sensors, determine vehicle events using the vehicle data, and transmit at least some of the vehicle data and at least some of the vehicle events to a vehicle management system, the telematics application retrieved from a first memory device, the vehicle data including (i) location data providing geographic locations of the vehicle while the vehicle travels the route and (ii) speed data providing traveling speeds of the vehicle while the vehicle travels the route; subsequent to the vehicle traveling the route, receiving and storing in a second memory device a plurality of custom scripts executable in the telematics application, the telematics application being configured to interpret the custom scripts; retrieving the custom scripts from the second memory device; and while executing the telematics application, executing the custom scripts in the telematics application to change a default functionality of the telematics application so that the telematics application causes the electronic device to control operation of a component associated with the vehicle differently than if the telematics application is executed without executing the custom scripts in the telematics application.

The method of the preceding paragraph can include one or more of the following features: The method can further include: under control of the electronic device: subsequent to executing the custom scripts in the telematics application, executing the telematics application without executing the custom scripts in the telematics application so that the default functionality of the telematics application is not changed. When executing the custom script in the telematics application, the custom script can receive the vehicle data from the telematics application rather than directly receiving the vehicle data from the vehicle engine computer and the plurality of sensors. The method can further include: under control of the electronic device: executing the custom script in the telematics application so that the telematics application performs a first operation not initiated by the custom script with a higher priority than a second operation initiated by the custom script.

BRIEF DESCRIPTION OF THE DRAWINGS

The features of various embodiments disclosed herein are described below with reference to the drawings. Throughout the drawings, reference numbers are re-used to indicate correspondence between referenced elements. The drawings are provided to illustrate embodiments described herein and not to limit the scope thereof.

DETAILED DESCRIPTION

I. Introduction

Fleet vehicles can be used for a variety of purposes. Fleet vehicles, for instance, can be used to move goods or people, construct buildings, or reshape land. Given the many different purposes for fleet vehicles, the types of data gathered and controls associated with operating a fleet of vehicles can vary significantly from one type of fleet vehicle to another. Moreover, even if fleets of vehicles are used for similar purposes, each fleet may operate using different business or technical practices that can influence the types of data gathered and the controls associated with how the different fleets are operated.

Advantageously, in certain embodiments, this disclosure describes features of executing custom fleet vehicle management scripts using in-vehicle devices associated with vehicles of a fleet of vehicles. The custom scripts can be installed by third-parties and executed by a telematics application installed on the in-vehicle devices to improve operations or provide additional capabilities to the telematics application of the in-vehicle devices. The features can be used, for example, to increase the functionality of the in-vehicle devices so that the in-vehicle devices are better able to perform custom operations for particular fleet vehicles, gather relevant custom vehicle data from particular fleet vehicles, and provide custom alerts for particular fleet vehicles.

Any of the systems and processes described herein can be performed in real time or near real-time. As used herein, the term "real-time" and the like, in addition to having its ordinary meaning, can mean rapidly or within a certain expected or predefined time interval, and not necessarily immediately. For instance, real-time feedback may be provided within a few seconds, few minutes, or 5 minutes, or 10 minutes, or some other short period of time after receiving information that triggers the determination of an output.

II. Vehicle Management System

Figure 1:
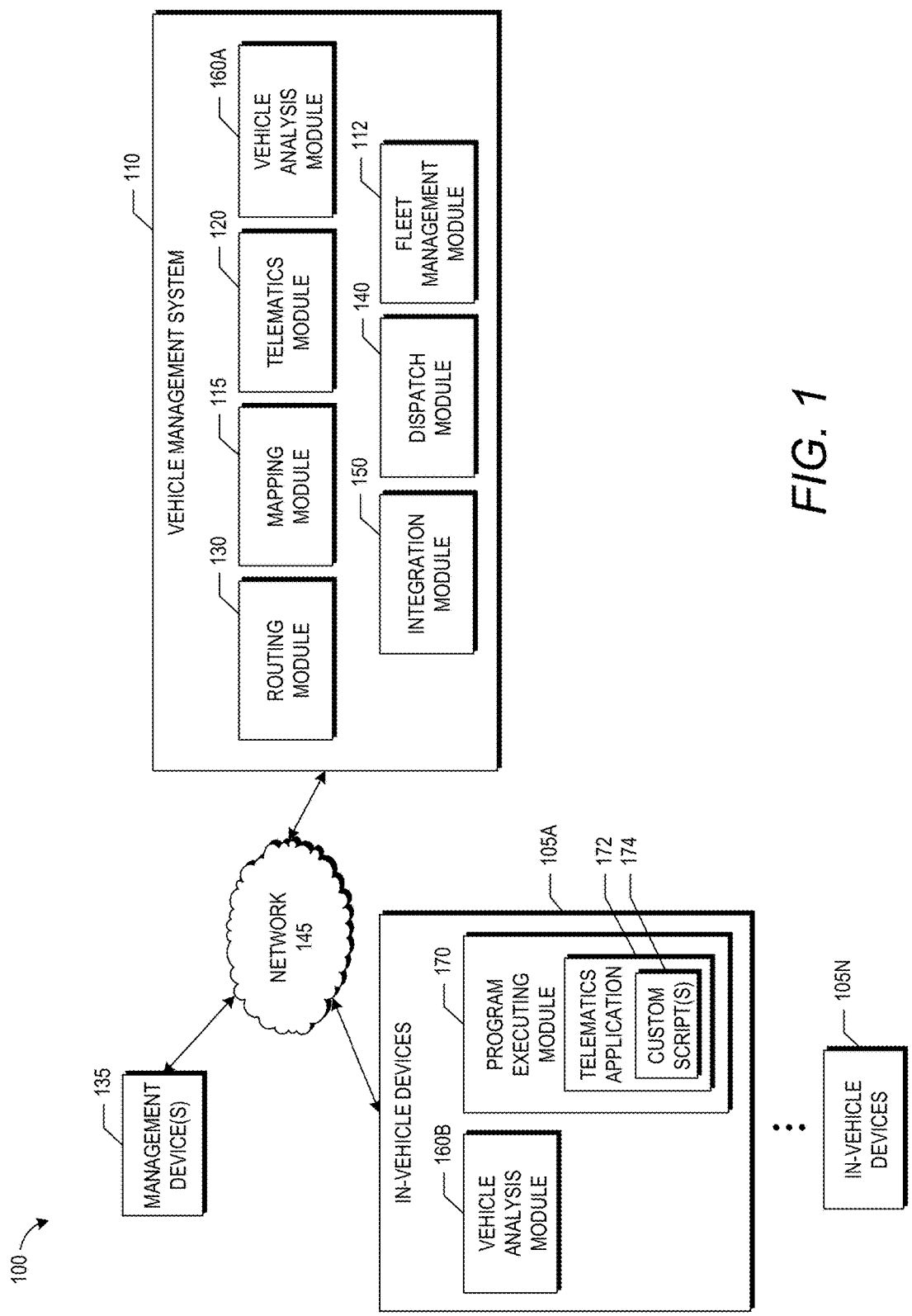
FIG. 1 illustrates an example computing environment including a vehicle management system and in-vehicle devices.

FIG. 1 illustrates a computing environment 100 for implementing an example of a vehicle management system 110, which is further described below. The example vehicle management system 110 shown includes a vehicle analysis module 160 that can perform analysis for vehicles and drivers of the vehicles. The vehicle analysis module 160 can be implemented by one or more physical computing devices, examples of which are provided below. The vehicle analysis module 160 can be configured to perform onboard and/or offboard analysis and may be implemented in the system 110 (as offboard module 160A) and/or in the vehicles (as onboard module 160B). The onboard vehicle analysis module 160B optionally included in the vehicle can include one or more computers coupled to the vehicle computer. For example, in one embodiment, the onboard vehicle analysis module 160B is a computing device or gateway device coupled to the vehicle computer through the OBDII port or CAN bus. The computing device can also be in communication with a radio device that transmits data from the computing device to the vehicle management system 110 or to other devices.

The vehicle analysis module 160A or 160B can collect and gather data and information about the engine from the vehicle computer and/or data from other sensors in or on the vehicle. The onboard vehicle analysis module 160B can communicate the collected vehicle data and information to the vehicle management system 110. In another embodiment, the onboard vehicle analysis module 160B filters or processes the data prior to sending the data to the vehicle management system 110. The onboard vehicle analysis module 160B can communicate some or all of the filtered data and information to the offboard vehicle analysis module 160A of the vehicle management system 110.

If the onboard vehicle analysis module 160B is unable to connect to a network or communicate with the vehicle management system 110, the onboard vehicle analysis module 160B can save and send the vehicle data when the onboard vehicle analysis module 160B is able to communicate with the server again. In some embodiments, the vehicle analysis module 160 can operatively couple with a mobile communication device located within the vehicle, such as a cell phone or other in-vehicle network capable electronic device. Vehicle diagnostic processes can be performed by the onboard vehicle analysis module 160B. The vehicle diagnostic processes can also be performed by the offboard vehicle analysis module 160A. In some embodiments, an initial analysis is performed by the onboard vehicle analysis module 160B and further analysis is performed by the offboard vehicle analysis module 160A.

The vehicle data collected by the onboard vehicle analysis module 160B can include vehicle condition information and engine data, such as vehicle year, make, model, engine/drive train, mileage, engine hours, start cycles, and other information related to vehicle condition. The vehicle data can also include check engine lights, fault codes, DTC codes, engine events, service intervals and other data collected from the engine computer. As mentioned above, the vehicle data collected by the onboard vehicle analysis module 160B can also include sensor data obtained from other sensors in the vehicle, such as tire pressure sensors, accelerometers, gyroscopes, temperature sensors, driver identification sensors (e.g., that communicate with an ID badge of a driver via RFID or the like), combinations of the same, or the like.

The onboard vehicle analysis module 160B and the vehicle management system 110 can provide or analyze additional data that can be used for diagnostic analysis. For example, such data can include data provided by the manufacturer regarding diagnostic conditions, data obtained by crowd sourcing or otherwise analyzing data provided by a community of fleet vehicles (including, for example, predictive diagnoses based on community analysis of diagnostic trends), or the like.

The offboard vehicle analysis module 160A can output the analysis and prognostic information obtained from the onboard vehicle analysis module 160B to one of management devices 135 operated by a fleet administrator or the like (which may be a mobile device), or any other device configured to receive notifications and updates from the offboard vehicle analysis module 160A. The output can include, for example, diagnostic codes or other diagnoses of vehicle problems, driver warnings, a list of proposed corrective actions, alarms, and/or other information provided by the onboard vehicle analysis module 160B to the system 110. Similarly, the onboard vehicle analysis module 160B can provide such outputs directly to the driver via an onboard computer (e.g., on a display thereof) or a driver's computing device or phone. The outputs to the driver can include any of the outputs described above, as well as optionally navigation directions to dispatch the driver to a repair facility (e.g., a nearest repair facility). The output could include a list of options of available service centers to perform the identified services, from which the driver can select and then be navigated to. Depending on the severity of the predicted failure, the outputs to the driver may, for more severe problems, provide rerouting to a nearest approved maintenance facility and navigate the driver to that location. For less severe problems, the outputs to the driver can indicate that maintenance should be performed soon or the like.

The output can also provide information and alerts to vehicle management system 110 or other fleet management personnel. The onboard vehicle analysis module 160B can analyze diagnostic data against one or more thresholds that are to be met prior to proceeding with changes to the vehicle route and/or recommending repairs. The thresholds can be machine-based and/or human-based thresholds. Machine-based thresholds could be determined by algorithms based on factors such as cost, time, energy usage, disruptive effect, and others. Human-based thresholds can include one or more approvals from the driver, vehicle maintenance personnel, management personnel, or others.

In some embodiments, the onboard vehicle analysis module 160B can filter data received from the engine computer and send a subset of the engine computer data (or other in-vehicle sensor data) to the offboard vehicle analysis module 160A. In some embodiments, the onboard vehicle analysis module 160B monitors the data received by the engine computer for changes. In one embodiment, when a change is detected, the updated data can be sent to the offboard vehicle analysis module 160A. For example, if the onboard vehicle analysis module 160B receives data from the engine computer continuously or substantially continuously, the onboard vehicle analysis module 160B may solely send data that was different from a previous set of data to the offboard vehicle analysis module 160A to conserve bandwidth. In another embodiment, the onboard vehicle analysis module 160B sends data periodically, such as once every hour or once every few hours, or even once a day or at longer intervals for measured parameters that change slowly.

Tire pressure data is an example of data that generally changes slowly. Instead of reporting tire pressure data to the vehicle management system 110 continuously or at frequent intervals (such as every 1 to 2 minutes), the onboard vehicle analysis module 160B can instead send updated tire pressure data to the vehicle management system 110 once per hour or couple of hours, once per day, or less frequently. In another embodiment, the onboard vehicle analysis module 160B sends updated tire pressure data to the vehicle management system 110 solely when the tire pressure changes more than a threshold amount. In another embodiment, the onboard vehicle analysis module 160B increases a frequency of transmission of sensor or engine data when the data changes more than a threshold amount. More generally, the onboard vehicle analysis module 160B can reduce, compress, or otherwise filter the diagnostic data sent to the vehicle management system 110.

Some of each of the in-vehicle devices 105 can include a program executing module 170. The program executing module 170 can provide functionality for a third-party to install custom script(s) 174 for execution by the program executing module 170 within a telematics application 172. The custom script(s) 174 can be separate from default programs, like the telematics application 172, installed for execution by the program executing module 170. The program executing module 170 can, for example, execute (1) default, pre-installed programs that may have been developed by the manufacturer, seller, or installer of the in-vehicle devices 105 (for instance, such as to assist in navigation of an associated fleet vehicle), (2) custom scripts that may not have been developed by the manufacturer, seller, or installer of the in-vehicle devices 105 but instead by a third-party like the end users of the in-vehicle devices 105, or (3) other programs or scripts. Data can be received by the program executing module 170 from the onboard vehicle analysis module 160B via an application programming interface (API) in order to use the data as inputs when executing the programs and scripts. In turn, the program executing module 170 can be used to control (such as via the API or other outputs) or monitor operations of a fleet vehicle by performing operations in accordance with the instructions of the telematics application 172 and based at least on the data received from the onboard vehicle analysis module 160B. The programs and scripts executed by the program executing module 170 can be stored in a memory (not shown) electronically coupled to the program executing module 170. In some embodiments, part or all of the program executing module 170 and part or all of the onboard vehicle analysis module 160B can part of the same module. In other embodiments, the program executing module 170 and the onboard vehicle analysis module 160B can be separate modules.

As used herein, the terms "application" or "program," in addition to having their ordinary meanings, can refer to an executable code that when executed by a hardware processor causes the hardware processor to perform operations in accordance with the executable code. In some instances, an application or a program, moreover, may refer to executable code that is compiled. As used herein, the term "script," in addition to having its ordinary meaning, can refer to an executable script that when executed causes a hardware processor to perform operations in accordance with the executable script. In some instances, a script, moreover, may refer to executable script that is interpreted rather than compiled.

Figure 2:
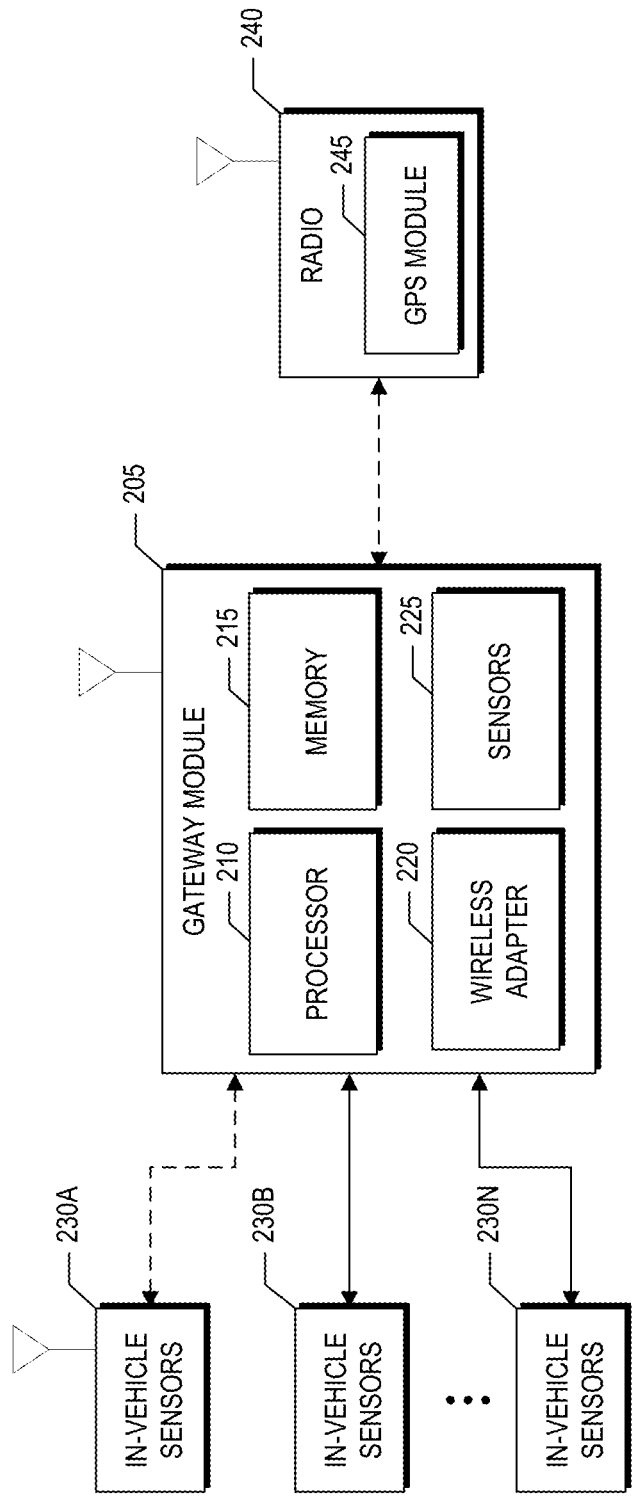
FIG. 2 illustrates an example in-vehicle device.

FIG. 2 illustrates a gateway module 205. The gateway module 205 is a more detailed embodiment of one of the in-vehicle devices 105 described herein and includes some or all the features thereof. The gateway module 205 can be a vehicle-based data acquisition and transmission sub-system. In the depicted embodiment, the gateway module 205 has a processor 210, memory 215, a wireless adapter 220, and one or more sensors 225. In some embodiments, the sensors 225 are omitted. The sensors 225 can be configured to measure vehicle data, such as vehicle position, temperature, time, acceleration, audio, and direction.

A radio 240 communicates with the gateway module 205, either wirelessly or through a wired connection (e.g., with a serial cable or the like). The radio 240 includes a GPS module 245 that detects vehicle position. The radio 240 can transmit data received from the gateway module 205 to the vehicle management system 110. The radio 240 can also communicate vehicle positioning data received from the GPS module 245 to the vehicle management system 110. In one embodiment, the radio 240 communicates with the vehicle management system by placing a cell phone call to a server of the vehicle management system 110. The radio 240 can also communicate with the server at the vehicle management system 110 using TCP/IP, UDP, or other protocols. By sending data frequently or periodically, the radio 240 can keep the connection to the server open, which can guarantee or help to guarantee data reliability.

Any number of in-vehicle sensors 230 located within the vehicle can communicate with the gateway module 205. The in-vehicle sensors 230 can be located throughout the vehicle, including, for example, the engine, tires, vehicle body, trailer, cargo areas, and other locations on and within the vehicle. Some examples of vehicle sensors include engine oil sensors, fuel level sensors, light sensors, door sensors, ignition sensors, temperature sensors (including in cab and in trailer), and tire pressure sensors. At least some of the in-vehicle sensors 230 can communicate with the engine computer or other engine hardware configured to receive and process the data. The in-vehicle sensors can also be located remotely and can transmit the data wirelessly to the engine computer or other data processing hardware. For example, a tire pressure sensor could wirelessly transmit tire pressure data to the engine computer for processing.

Likewise, the gateway module 205 can also include sensors 225. One example of a sensor 225 that may be included in the gateway is an accelerometer. An accelerometer can detect hard braking, cornering, and acceleration. The accelerometer can therefore allow position coordinates to be updated without resort to GPS or triangulation technology. For example, the accelerometer can provide for short-term position reporting that operates without resorting to GPS signals. The gateway module 205 can offer a low cost longitude, latitude capability and combined hard braking sensor for vehicle history applications, such as the vehicle history systems and methods described in U.S. application Ser. No. 13/251,129, titled "History Timeline Display for Vehicle Fleet Management," filed Sep. 30, 2011, the disclosure of which is hereby incorporated by reference in its entirety. As a device, in certain embodiments, the gateway module 205 can enable data from multiple sensors to be acquired without adding wires or optical connections to the vehicle for those sensors.

The gateway module 205 can be in communication with some or all of the in-vehicle sensors 230. For example, the gateway module 205 can be coupled to an OBDII or CAN bus in the vehicle to thereby receive in-vehicle sensor information from the engine computer. In some embodiments, one or more in-vehicle sensors can be directly coupled to the gateway module 205, or the gateway module 205 can be configured to communicate wirelessly with the in-vehicle sensors. For example, the gateway module could receive cargo bay temperature data from a temperature sensor wirelessly transmitting the data. The wireless sensors can use point-to-point transmission using wireless transmission standards such as Bluetooth or Zigbee.

The processor 210 and memory 215 of the gateway module 205 can implement various features. Among others, the processor 210 of the gateway module 205 can perform the operations associated with the onboard vehicle analysis module 160b and the program executing module 170 described herein. The gateway module 205 can act as an intermediary processing platform for the vehicle management system 110. The gateway module 205 can process the data received from the in-vehicle sensors 230 and send a subset of the total data collected to the vehicle management system 110. The gateway module 205 can collect hundreds or thousands or more data points from sensors 225, in-vehicle sensors 230, and the engine computer. The gateway module 205 can, among other things, analyze, categorize, compress, or otherwise process the data before transmitting it to the vehicle management system 110. By preprocessing the data prior to sending the information to the vehicle management system 110, the gateway module 205 can determine what data to send to the vehicle management system 110, which can reduce redundant processing and bandwidth used to continually transmit vehicle data.

The gateway module 205 can monitor several vehicle characteristics. The sensors 225, 230 can provide information to the gateway module 205 at a specific frequency for each vehicle characteristic; however, the sensors 225, 230 may generally be recording data at a faster rate than the monitored vehicle characteristic is changing. As such, sending all of the data to the vehicle management system 110 every time a sensor provides data can waste bandwidth and provide redundant data points for the vehicle management system 110 to process. Advantageously, in certain embodiments, instead of sending all of this data to the vehicle management system 110, the gateway module 205 processes the data and selectively updates the vehicle management system 110. The gateway module 205 can also compress the data that is received. The gateway module 205 can selectively compress portions of the data using wavelet transforms or other compression techniques, including any lossy or lossless compression techniques. For example, the data relating to vehicle characteristics that are slowly changing can be compressed.

The gateway module 205 can process vehicle characteristics according to the rate at which the characteristics change. For example, engine characteristics can range from relatively slower changing characteristics, such as tire pressure or average fuel consumption, to relatively faster changing characteristics, such as engine RPM and speed. The gateway module 205 can provide updates to the vehicle management system 110 using different update approaches for each vehicle characteristic, including periodic updates, threshold-based updates, event-based updates, user-specified updates, and/or a combination of methods.

Periodic updates can provide updates to the vehicle management system 110 at a specified frequency. For example, the gateway module 205 may update the remaining vehicle fuel data every 5 minutes. Threshold based updates can provide updates when the value of the vehicle characteristic meets or exceeds a specified threshold. The thresholds can be static, determined dynamically by the system, user specified, or determined using any other method. The thresholds can be absolute, such as a specific value, or relative, such as a percentage based change a specific number of units. For example, tire pressure data could be updated when the tire pressure changes by 10%, or when it changes by 2 psi, or if pressure drops below 35 psi. Event-based updates can prompt updates after a specific event occurs. For example, an update of all the vehicle characteristics may be provided when the engine starts or when an engine error is detected.

The gateway module 205 can use a combination of methods or algorithms to determine the frequency of the updates to the vehicle management system 110. For example, the tire pressure data could have a periodic update and a threshold based update. The tire pressure data could be updated every 30 minutes. However if there was a blowout, it can be beneficial to have a more rapid or immediate update to the tire pressure. As such, the gateway module 205 could evaluate the tire pressure against a threshold that updates tire pressure when a change is detected. The gateway module 205 can provide update routines that are dependent on the operational phase of the vehicle, such as warm-up operation versus normal operation. As engine conditions stabilize after warm-up the gateway module 205 can increase the intervals at which updates are provided to the vehicle management system 110. In some embodiments the gateway module 205 can send the updated data to the vehicle management system 205 and the raw data. The raw vehicle data can include some or all of the data that the gateway module 205 receives from the sensors and vehicle computer. The raw data can be transmitted with or without the preprocessed updated vehicle data.

More generally, in certain embodiments, the gateway module 205 can be a system that performs wired and/or wireless data acquisition within a vehicle. The gateway module 205 can pool data from various sensors, apply time stamps to the data, reformat the data, encode the data, and/or encrypt the data. Software running on the gateway module 205 can manage data acquisition and data formatting. The gateway module 205 can therefore acquire diagnostic bus and motor vehicle status data and buffer the data and forward the data directly to the vehicle management system or another in-vehicle device (such as a driver's cell phone, tablet, or laptop) via WiFi, Ethernet, RS232/422, USB or other suitable physical interfaces.

III. Custom Fleet Vehicle Control and Monitoring

In some fleet vehicle systems, in-vehicle devices can be fixed in the programs or scripts that can be run by the in-vehicle devices. The default programs or scripts installed on the in-vehicle devices can, for instance, be determined before the end users of the in-vehicle devices begin using the in-vehicle devices, and the end users may be limited to using only the default programs or scripts installed on the in-vehicle devices. In yet other systems, the in-vehicle devices can permit some amount of configuration by end users of the programs executed by the in-vehicle devices, such as by enabling the end users to adjust thresholds used to trigger different events when in-vehicle devices execute the default programs. However, such approaches fail to enable end users to have as much flexibility in controlling or monitoring fleet vehicles using the in-vehicle devices as can be desirable.

The program executing module 170 of the in-vehicle devices 105 can be used to install and execute the custom script(s) 174 that provides the telematics application 172 of the in-vehicle devices 105 with the ability to perform functions specific to a particular fleet of vehicles. The program executing module 170 can execute the custom script(s) 174 in a controlled container (sometimes referred to as a sandbox environment) of the telematics application 172 so as to enable a limited amount of custom code to be executed in an isolated environment. In some embodiments, the custom script(s) 174 can be installed by a third-party onto tens, hundreds, or thousands or more of the in-vehicle devices 105. Moreover, multiple custom script(s) 174 can be installed onto individual in-vehicle devices 105, and the multiple custom script(s) may be executed simultaneously in the telematics application 172.

In one example, the program executing module 170 can access and execute a custom script of the custom script(s) 174 that monitors a fleet vehicle's speed, latitude, and longitude received from the onboard vehicle analysis module 160B. Using the speed, latitude, and longitude, the program executing module 170 can determine occurrences of a roll event (for example, where the fleet vehicle travels a certain distance at least a certain speed) by the fleet vehicle and report the occurrences to the vehicle management system 110. The occurrence of the roll event may not be important to monitoring most types of fleet vehicles, and thus may not have been installed by the manufacturer or seller of the in-vehicle devices 105. However, for select group of fleet vehicles, the roll event may be a significant event and may desirably be reported by the in-vehicle devices 105 to the vehicle management system 110.

In another example, the program executing module 170 can communicate with a keypad mounted on the outside of a fleet vehicle, such as a rental car. A driver who desires to enter and access the fleet vehicle can punch in a pin number to the keypad. Upon entry of the pin number by the driver, the pin number can be transmitted by the keypad to the program executing module 170, which can be executing a custom script of the custom script(s) 174 in the telematics application for processing the pin number. The program executing module 170 can, in turn, process the pin number and communicate the pin number to the vehicle management system 110 to confirm that the pin number is correct for the vehicle. In response, the vehicle management system 110 may send a message to the program executing module 170 confirming whether the pin number is correct and indicating, if the pin is correct, to unlock the door locks of the fleet vehicle. Such a functionality may not be important to operating most types of fleet vehicles, and thus may not have been installed by the manufacturer or seller of the in-vehicle devices 105. However, for select group of fleet vehicles, the ability to process keypad inputs can be beneficial and desirably performed by the in-vehicle devices 105.

As an additional example, the program executing module 170 can access and execute a custom script of the custom script(s) 174 that determines maintenance and prognostic data for a fleet vehicle. The maintenance and prognostic data may be relatively unique and of interest to managers of a small number of types of fleet vehicles. On a periodic or other basis, the program executing module 170 can transmit the maintenance and prognostic data to the vehicle management system 110 or one or more of the management devices 135 so that, for instance, anticipatory maintenance decisions can be made about the fleet vehicle. Such unique maintenance and prognostic data may not be important to operating most types of fleet vehicles, and thus may not have been installed by the manufacturer or seller of the in-vehicle devices 105. However, for select group of fleet vehicles, the ability to gather and process this data can be beneficial and desirably performed by the in-vehicle devices 105.

The ability of the program executing module 170 to execute custom programs or scripts, such as the custom script(s) 174 executable in the telematics application 172, can be limited, for instance, to prevent overwhelming the functioning of the in-vehicle devices 105 with executing custom programs or scripts. The program executing module 170 can enable certain functionality or access to certain inputs or controls by executed custom programs or scripts, but not enable certain other functionality or access to certain other inputs or controls by executed custom programs or scripts. Moreover, the program excluding module 170 can control the priority of executing programs such that custom programs or scripts are executed with a lower priority than other programs or scripts executed by the program executing module 170. For example, the program executing module 170 can execute a navigation program or script with a higher priority than custom programs or scripts so that operations performed by the custom programs or scripts are slowed before operations performed by the navigation program or script in the event of limited processing resources. As another example, the program executing module 170 can execute the default functionality of the telematics application 172 with a higher priority than the custom script(s) 174 being executed by the telematics application 172.

The ability to install a custom program or script for execution by the program executing module 170, such as in the telematics application 172, can be limited in some instances. A user, for example, may be required to provide authentication to the vehicle management system 110 or the in-vehicle devices 105 before the program executing module 170 can install the custom program or script. As another example, to diminish a bandwidth usage or amount of data transmitted, the vehicle management system 110 or the in-vehicle devices 105 can limit a data transfer speed or amount of custom program or script data that is transferable over a period of time. For example, such limits can prevent excess data transfer charges that may be incurred (for example, that may be owed to a cellular data service provider) when communicating the custom program or script to one or more of the in-vehicle devices 105 for installation.

The custom program or script, such as the custom script(s) 174 executable in the telematics application 172, can provide programming capabilities to a third-party that enable flexible and sophisticated controls or data monitoring to be implemented by the program executing module 170. As a result, in certain embodiments, the custom program or script can advantageously permit the program executing module 170 to perform a tremendous variety of functions that can be suited directly to the needs of particular fleets of vehicles. In one example, a custom program or script, such as one of the custom script(s) 174 executable in the telematics application 172, executed by the program executing module 170 can be used to initiate a data service call for a fleet vehicle. As another example, in addition to processing locally determined data from the onboard vehicle analysis module 160B, a custom program or script, such as one of the custom script(s) 174 executable in the telematics application 172, can process fleet specific data about a fleet vehicle or a driver of the fleet vehicle that was received from the vehicle management system 110 or one of the management devices 135 to make better control and monitoring decisions for the fleet vehicle. In one embodiment, the custom script executable by the program executing module 170, such as the custom script(s) 174, can be custom JavaScript™ code. In other embodiments, other programming or scripting languages can be used such as C++, Java™, or Python™, for instance.

The in-vehicle devices 105 or the program executing module 170 can operate at least using a Linux™ operating system in certain embodiments. In other embodiments, the in-vehicle devices 105 or the program executing module 170 can operate at least using a different operating system, such as Microsoft™ Windows™, or Apple™ iOS™, for instance.

In some embodiments, some of each of the in-vehicle devices 105 can be retrofitted with the program executing module 170. As a result, the in-vehicle devices 105 not originally having the ability to execute a custom program or script can be retrofitted so as to be able execute the custom program or script, such as the custom script(s) 174 in the telematics application 172.

The vehicle management system 110 or the management devices 135 can run a web-based or local application development environment for simulating the execution of a custom program or script, such as the custom script(s) 174 executable in the telematics application 172, by the program executing module 170. In the development environment, the user can execute a custom program or script and review the operation of the custom program or script in the virtual environment to experiment and evaluate the functioning of the custom program or script.

IV. Custom Scripts for In-Vehicle Devices

Figure 3:
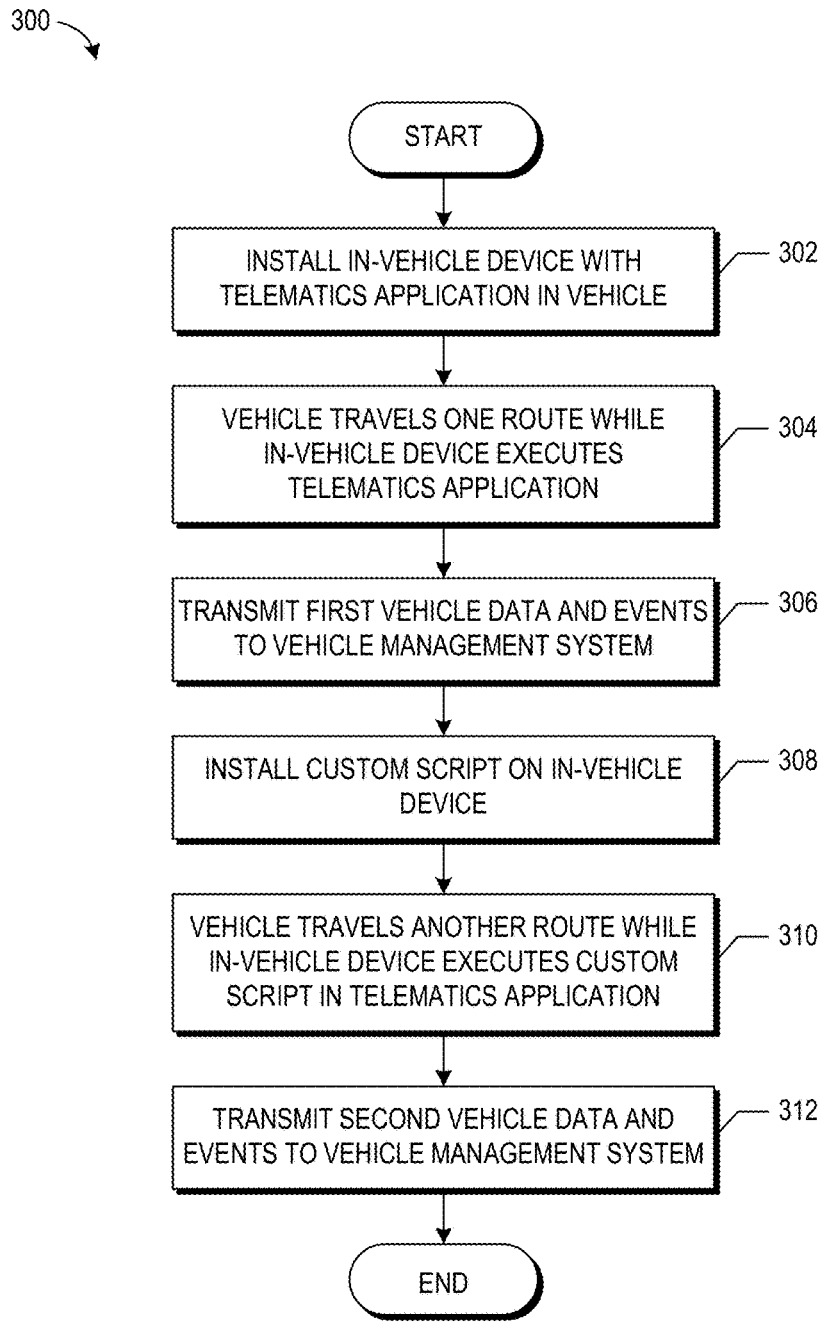
FIG. 3 illustrates an example telematics application and custom script deployment process.

FIG. 3 depicts a telematics application and custom script deployment process 300. The process 300 illustrates an example mode of operation of the computing environment 100 and may be implemented by the various components shown in the computing environment 100. For convenience, the process 300 is described in the context of the computing environment 100 but may instead be implemented by other systems described herein or other computing systems not shown. The process 300 provides one example approach by which one of the in-vehicle devices 105, such as the in-vehicle device 105A, can used with and without a custom script before and after the custom script is installed on the one of the in-vehicle devices 150.

At block 302, the in-vehicle device 105A can be installed in a vehicle. The in-vehicle device 105A can have the telematics application 172 installed in a memory of the in-vehicle device 105A, such as the memory 215, that enables the in-vehicle device 105A to perform telematics functionality for the vehicle, such as collecting vehicle data, determining vehicle events from the vehicle data, and reporting at least some of the vehicle data and the vehicle events to the vehicle management system 110. The installation of the in-vehicle device 105A can be considered the deployment of the in-vehicle device 105A such that the in-vehicle device 105A may be now ready for use by an end-user.

At block 304, the vehicle can travel one route while the in-vehicle device 105A executes the telematics application 172. The in-vehicle device 105A notably, at this time, may execute the telematics application 172 without executing a custom script, for instance, because a custom script may not yet have been installed on the in-vehicle device 105A. Execution of the telematics application 172 by the in-vehicle device 105A can cause the in-vehicle device 105A to perform the telematics functionality for the vehicle, such as to collect location data, speed data, or acceleration data while the vehicle travels the route or to determine vehicle events such as a hard braking or hard acceleration during which the vehicle experiences more than a threshold deceleration or acceleration. At block 306, the in-vehicle device 105A can transmit first vehicle data and events to the vehicle management system 110 according to instructions from the telematics application 172.

At block 308, a custom script, such as one of the custom script(s) 174 can be installed on the in vehicle device for execution by the telematics application 172. The custom script can include instructions for the telematics application 172 to perform multiple custom operations and can, for instance, include JavaScript™ code. The custom script can be interpreted by the telematics application 172 and may not be compiled. The custom script can be installed by an individual other than a manufacturer of the vehicle or the in-vehicle device 105A and may be installed remotely, such as via a wireless communication network. In some implementations, the custom script may be installed if the custom script is provided by an authenticated user or the custom script is provided with expected authentication information, but may not be installed if the custom script is provided by an unauthenticated user or the custom script is provided with unexpected authentication information.

At block 310, the vehicle can travel another route while the in-vehicle device 105A executes the custom script in the telematics application 172. The execution of the custom script in the telematics application 172 can change a default functionality of the telematics application 172 so that the telematics application 172 causes the in-vehicle device 105A to function differently than if the telematics application 172 were executed without executing the custom script in the telematics application 172. In some implementations, the custom script may be executed if the custom script is provided by an authenticated user or the custom script is provided with expected authentication information, but may not be executed if the custom script is provided by an unauthenticated user or the custom script is provided with unexpected authentication information. Moreover, in certain embodiments, the custom script may receive vehicle data from the telematics application 172 rather than directly receiving the vehicle data from the vehicle engine computer or the sensors 225 and 230.

At block 312, the in-vehicle device 105A can transmit second vehicle data and events to the vehicle management system 110 according to instructions from the custom script executed by the telematics application 172. As a result, the second vehicle data and events can be different from the first vehicle data and events due to the instructions provided by the custom script.

Figure 4:
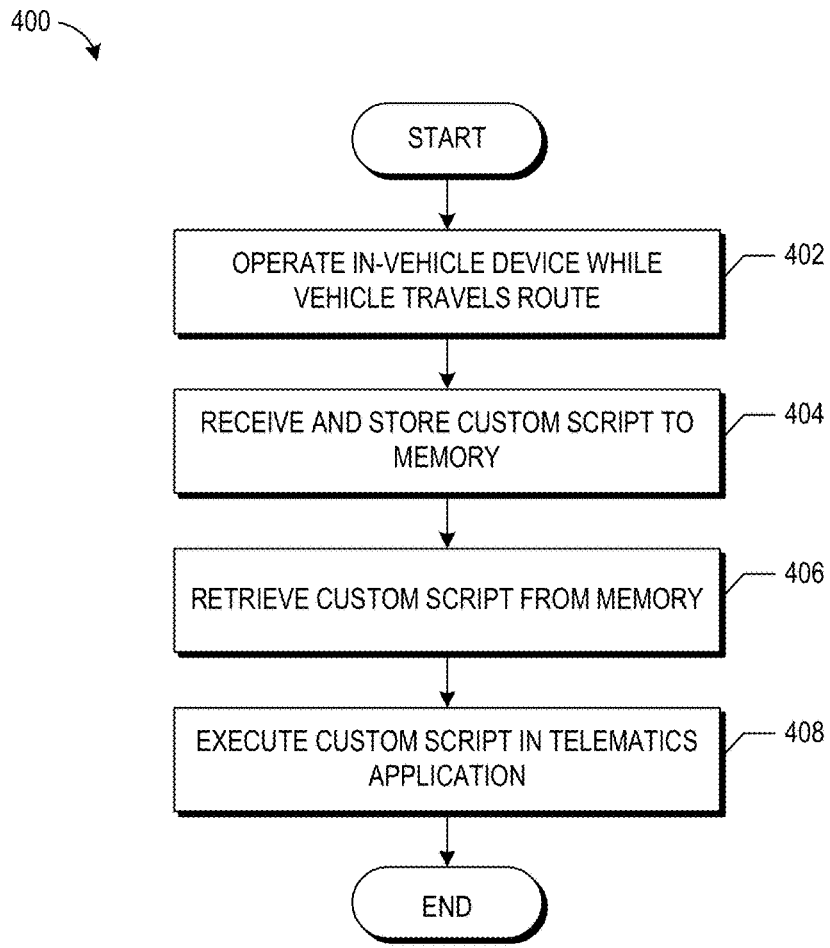
FIG. 4 illustrates an example in-vehicle device usage process.

FIG. 4 depicts an in-vehicle device usage process 400. The process 400 illustrates an example mode of operation of the computing environment 100 and may be implemented by the various components shown in the computing environment 100. For convenience, the process 400 is described in the context of the computing environment 100 but may instead be implemented by other systems described herein or other computing systems not shown. The process 400 provides one example approach by which one of the in-vehicle devices 105, such as the in-vehicle device 105A, can used with and without a custom script.

At block 402, the in-vehicle device 105A can operate while a vehicle travels a route such that the telematics application 172 is executed while the vehicle travels the route. One or more operations at block 402 can be the same as or similar to one or more of the operations at blocks 304 or 306 of the process 300. The telematics functionality provided by the telematics application 172 can include one or more of the telematics features described herein or the like.

At block 404, the in-vehicle device 105A can receive a custom script and store the custom script to the memory 215. One or more operations at block 404 can be the same as or similar to one or more of the operations at blocks 308 of the process 300. At block 406, the in-vehicle device 105A can retrieve the custom script from the memory 215. The in-vehicle device 105A can, for instance, retrieved the custom script in response to a user input or a call for the custom script by the telematics application 172.

At block 408, the in-vehicle device 105A can execute the custom script in the telematics application 172. One or more operations at block 408 can be the same as or similar to one or more of the operations at blocks 310 and 312 of the process 300. Moreover, the telematics application 172 can cause the in-vehicle device 105A to function differently so that the telematics application 172 causes the in-vehicle device 105A to control operation of a component associated with the vehicle, such as (i) one of the sensors 225 and 230 (for example, by changing a sensor configuration for the one sensor) or (ii) a transmitter (for example, by causing the transmitted to complete a data service call. Additionally or alternatively, the telematics application 172 can cause the in-vehicle device 105A to function differently so that the telematics application 172 causes the in-vehicle device 105A to (i) determine an occurrence of an event from the vehicle data according to event determination instructions of the custom script and output an indication of the event for presentation to a driver or to the vehicle management system 110 or (ii) analyze vehicle data according to data analysis instructions of the custom script and output the data analysis for presentation to a driver of the vehicle or to the vehicle management system 110.

In some embodiments, when the custom script is executed in the telematics application 172, the custom script can be enabled to adjust a functionality of the telematics application 172 when the telematics application 172 processes a first set of vehicle data (for example, of a certain type, quality, or having another distinguishing characteristic) and may not be enabled to adjust the functionality of the telematics application 172 when the telematics application 172 processes a second set of vehicle data different from the first set (for example, of a different type, quality, or having another distinguishing characteristic from the first set). In some embodiments, when the custom script is executed in the telematics application 172, the custom script can be enabled to adjust a functionality of the telematics application 172 when the telematics application 172 performs a first operation (for example, of a certain type, quality, or having another distinguishing characteristic) on vehicle data and may not be enabled to adjust the functionality of the telematics application 172 when the telematics application 172 performs a second operation different from the first operation (for example, of a different type, quality, or having another distinguishing characteristic from the first operation) on the vehicle data. In some embodiments, when the custom script is executed in the telematics application 172, an operation performed by the telematics application 172 that is initiated by the custom script can be assigned a lower priority by the telematics application 172 than an operation performed by the telematics application 172 that is initiated by the telematics application 172 and not the custom script.

The execution of the custom script(s) 174 in the telematics application 172 can be controllable such that the one or more of the custom script(s) 174 can be enabled or disabled, as well as added or deleted. For example, each of the custom script(s) 174 can be associated with an enable or disable flag that indicates whether the telematics application 172 should execute a corresponding one of the custom script(s) 174. The enable or disable flags can be user controllable, in some instances, such as via a command message from the vehicle management system 110. As a result, the telematics application 172 may readily be able to adopt revised or new functionalities or return to default functionalities.

Although the custom or default programs or scripts described herein can be, in some instances, programs or scripts that initiate and then run to completion within a relatively short time period, the custom or default programs or scripts described herein can be additionally or alternatively long-lived programs or scripts. The program executing module 170 can, for example, execute a custom or default program or script so that the custom or default program or script functions as a service for minutes, hours, days, years, or the like and thereby provides functionality to other devices, other custom programs or scripts, default programs or scripts, the vehicle management system 110, or one or more of the management devices 135.

V. Custom Script Application Program Interface

The custom script(s) 174 can be exposed to a specific API by the telematics application 172. For instance, the specific API can include one or more of the following classes in certain implementations: Api (for example, a globally available custom scripts and expose methods to interact with one of the in-vehicle devices), DiagnosticValue (for example, can be used to access vehicle diagnostics read from a vehicle bus, such as OBDII or J1939, and can be passed via a diagnosticUpdate event), Esn (for example, can be used to access an in-vehicle device electronic serial number), GPS (for example, can be used to access a vehicle's location, speed, ignition state, heading, longitude, latitude, and speedMph and can be passed via a gps event), MaxAccelerationExceeded (for example, can be used to access whether a vehicle has exceeded a maximum allowed acceleration or deceleration, indicate type of acceleration detected, and can be passed via a MaxAccelerationExceeded event), MaxSpeedExceeded (for example, can be used to access whether a vehicle has exceeded a maximum speed allowed or dropped below the maximum speed and can be passed via a maxSpeedExceeded event), MotionChanged (for example, can be used to access whether the vehicle is in motion and can be passed via the motionChanged event), and Odometer (for example, can be used to access the odometer delta).

VI. Example Vehicle Management System

As described above, FIG. 1 illustrates an embodiment of a computing environment 100 for implementing a vehicle management system 110 that can implement any of the features described herein, including the enclosed Appendix.

In the computing environment 100, one or more in-vehicle devices 105A . . . 105N and management devices 135 communicate with the vehicle management system 110 over a network 145. The in-vehicle devices 105 can include computing devices installed in fleet vehicles. These devices 105 can include navigation functionality, routing functionality, and the like. The in-vehicle devices 105 can receive route information and other information from the vehicle management system 110. In addition, the in-vehicle devices 105 can report information to the vehicle management system 110, such as driver location, vehicle sensor data, vehicle status (e.g., maintenance, tire pressure, or the like), and so forth.

The management devices 135 can be computing devices used by dispatchers, fleet managers, administrators, or other users to manage different aspects of the vehicle management system 110. For example, a user of one of the management devices 135 can access the vehicle management system 110 to generate routes, dispatch vehicles and drivers, and perform other individual vehicle or fleet management functions. With the management devices 135, users can access and monitor vehicle information obtained from one or more of the in-vehicle devices 105 by the vehicle management system 110. Such vehicle status information can include data on vehicle routes used, stops, speed, vehicle feature usage (such as power takeoff device usage), driver behavior and performance, vehicle emissions, vehicle maintenance, energy usage, and the like. In some embodiments, the management devices 135 are in fixed locations, such as at a dispatch center. The management devices 135 can also be used by administrators in the field, and may include mobile devices, laptops, tablets, smartphones, personal digital assistants (PDAs), desktops, or the like.

The vehicle management system 110 can be implemented by one or more physical computing devices, such as servers. These servers can be physically co-located or can be geographically separate, for example, in different data centers. In one embodiment, the vehicle management system 110 is implemented as a cloud computing application. For instance, the vehicle management system 110 can be a cloud-implemented platform hosted in one or more virtual servers and/or physical servers accessible to users over the Internet or other network 145. In the depicted embodiment, the vehicle management system 110 includes a fleet management module 112, a mapping module 115, a telematics module 120, a routing module 130, a dispatch module 140, and an integration module 150. These components can, but need not, be integrated together on a common software or hardware platform.

The fleet management module 112 can include functionality for generating, rendering, or otherwise displaying a vehicle management user interface 114. The vehicle management user interface 114 can include a map or list of vehicles that depicts symbols or other data representative of vehicles. As used herein, the terms "output a user interface for presentation to a user," "presenting a user interface to a user," and the like, in addition to having their ordinary meaning, can also mean (among other things) transmitting user interface information over a network, such that a user device can actually display the user interface.

The fleet management module 112 can communicate with the mapping module 115 to obtain mapping data, which the fleet management module 112 can include in the vehicle management user interface 114. The mapping data can be compressed, transmitted, re-rendered, and displayed on the management user interface 114. Other data can also be overlaid to enhance the map and management layout. The mapping module 115 can be a geographic information system (GIS) in one embodiment. The fleet management module 112 can also access the telematics module 120 to obtain vehicle status data for inclusion in-vehicle history timelines. The telematics module 120 can provide this vehicle status data based on telematics data obtained from the in-vehicle devices 105N. The telematics data can include such data as location or speed information obtained using GPS or cellular tower triangulation (or other methods), vehicle sensor data, solid state inertial information, or any other data that can be obtained from a vehicle, its engine, or the like (including other sensors such as passenger seat sensors to detect the presence of passengers and so forth).

The routing module 130 can implement any of the routing features described above. In addition, the routing module 130 can construct pre-dispatch or post-dispatch routes for vehicles based on any of a variety of routing algorithms, such as those disclosed in U.S. Publication No. 2010/0153005, filed Dec. 8, 2009, and entitled "System and Method for Efficient Routing on a Network in the Presence of Multiple-Edge Restrictions and Other Constraints," the disclosure of which is hereby incorporated by reference in its entirety. In addition, the routing module 130 can automatically select routes that take into account factors that affect energy usage using the techniques described in U.S. application Ser. No. 12/954,547, filed Nov. 24, 2010, and entitled "Vehicle Route Selection Based on Energy Usage," the disclosure of which is hereby incorporated by reference in its entirety.

The integration module 130 can facilitate integration of the vehicle management system 110 with other systems, such as fuel card systems, payroll systems, supply chain system, insurance systems, and the like. The dispatch module 140 can provide functionality for users of the management devices 135 to assign drivers and vehicles to routes selected by the routing module 130.

Furthermore, although not shown, the vehicle management system 110 may include functionality for disabling an engine remotely to recover a stolen vehicle (as permitted in Europe and some other areas).

The illustrated network 145 may be a LAN, a WAN, the Internet, combinations of the same, or the like. For ease of illustration, the vehicle management system 110 has been depicted as a centralized system. However, in other implementations, at least some of the functionality of the vehicle management system 110 is implemented in other devices. Other possible implementations of the vehicle management system 110 can include many more or fewer components than those shown in FIG. 1.

VII. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for gathering vehicle data from a vehicle computer installed in a vehicle and a plurality of sensors disposed about the vehicle and providing functionality for a third-party to install and then execute custom scripts within a telematics application to change default functionalities of the telematics application when processing the vehicle data, the system comprising:
    an electronic device comprising digital logic circuitry and configured to be installed in a vehicle, the electronic device comprising a port configured to couple with a vehicle computer installed in the vehicle and have wired or wireless connections with a plurality of sensors disposed about the vehicle; and
    a first memory device in communication with the electronic device, the first memory device storing a telematics application that when executed by the electronic device causes the electronic device to gather vehicle data received from the vehicle computer and the plurality of sensors and determine vehicle events for the vehicle,
    wherein the electronic device is configured to:
        while the vehicle travels a route, execute the telematics application causing the electronic device to gather the vehicle data, determine the vehicle events, and transmit at least some of the vehicle data and at least some of the vehicle events to a vehicle management system,
        subsequent to the vehicle traveling the route, receive and store in a second memory device a custom script executable in the telematics application, the telematics application being configured to interpret the custom script,
        retrieve the custom script from the second memory device, and
        while executing the telematics application, execute the custom script in the telematics application to change a default functionality of the telematics application so that the telematics application causes the electronic device to control operation of a component associated with the vehicle differently than if the telematics application is executed without executing the custom script in the telematics application,
    wherein the component comprises a sensor of the plurality of sensors, and the electronic device is configured to execute the custom script in the telematics application to change the default functionality of the telematics application so that the telematics application causes the electronic device to control operation of the sensor to adjust a configuration of the sensor.

2. The system of claim 1, wherein the custom script comprises instructions for the telematics application to perform a plurality of custom operations.

3. The system of claim 2, wherein the electronic device is configured to receive the custom script from an individual other than a manufacturer of the vehicle or a manufacturer of the electronic device.

4. The system of claim 2, wherein the instructions comprise event determination instructions which when executed in the telematics application cause the electronic device to:
    determine an occurrence of an event from the vehicle data according to the event determination instructions; and
    output an indication of the event for presentation to a driver of the vehicle or to the vehicle management system.

5. The system of claim 2, wherein the instructions comprise data analysis instructions which when executed in the telematics application cause the electronic device to:
    analyze the vehicle data according to the data analysis instructions to generate analysis data; and
    output the analysis data for presentation to a driver of the vehicle or to the vehicle management system.

6. The system of claim 1, wherein subsequent to executing the custom script in the telematics application, the electronic device is configured to execute the telematics application without executing the custom script in the telematics application so that the default functionality of the telematics application is not changed.

7. The system of claim 1, wherein the electronic device is configured to:
    in response to receiving a first user input indicating to enable execution of the custom script in the telematics application, execute the custom script in the telematics application; and
    in response to receiving a second user input indicating to disable execution of the custom script in the telematics application, execute the telematics application without executing the custom script.

8. The system of claim 1, wherein when the electronic device executes the custom script in the telematics application, the custom script receives the vehicle data from the telematics application rather than directly receiving the vehicle data from the vehicle computer and the plurality of sensors.

9. A system for gathering vehicle data from a vehicle computer installed in a vehicle and a plurality of sensors disposed about the vehicle and providing functionality for a third-party to install and then execute custom scripts within a telematics application to change default functionalities of the telematics application when processing the vehicle data, the system comprising:

an electronic device comprising digital logic circuitry and configured to be installed in a vehicle, the electronic device comprising a port configured to couple with a vehicle computer installed in the vehicle and have wired or wireless connections with a plurality of sensors disposed about the vehicle; and a first memory device in communication with the electronic device, the first memory device storing a telematics application that when executed by the electronic device causes the electronic device to gather vehicle data received from the vehicle computer and the plurality of sensors and determine vehicle events for the vehicle, wherein the electronic device is configured to:
while the vehicle travels a route, execute the telematics application causing the electronic device to gather the vehicle data, determine the vehicle events, and transmit at least some of the vehicle data and at least some of the vehicle events to a vehicle management system, subsequent to the vehicle traveling the route, receive and store in a second memory device a custom script executable in the telematics application, the telematics application being configured to interpret the custom script, retrieve the custom script from the second memory device, and while executing the telematics application, execute the custom script in the telematics application to change a default functionality of the telematics application so that the telematics application causes the electronic device to control operation of a component associated with the vehicle differently than if the telematics application is executed without executing the custom script in the telematics application, wherein the component comprises a transmitter, and the electronic device is configured to execute the custom script in the telematics application to change the default functionality of the telematics application so that the telematics application causes the electronic device to control operation of the transmitter to complete a data service call.

10. The system of claim 9, wherein subsequent to executing the custom script in the telematics application, the electronic device is configured to execute the telematics application without executing the custom script in the telematics application so that the default functionality of the telematics application is not changed.

11. The system of claim 1, wherein when the electronic device executes the custom script in the telematics application, the custom script is enabled to adjust a functionality of the telematics application when the telematics application processes a first set of the vehicle data and is not enabled to adjust the functionality of the telematics application when the telematics application processes a second set of the vehicle data.

12. The system of claim 1, wherein when the electronic device executes the custom script in the telematics application, the custom script is enabled to adjust a functionality of the telematics application when the telematics application performs a first operation on the vehicle data and is not enabled to adjust the functionality of the telematics application when the telematics application performs a second operation on the vehicle data.

13. The system of claim 1, wherein when the electronic device executes the custom script in the telematics application, the telematics application performs a first operation not initiated by the custom script with a higher priority than a second operation initiated by the custom script.

14. The system of claim 1, wherein in response to determining that the custom script is provided by an unauthenticated user or that the custom script is provided with unexpected authentication information, the electronic device is configured to not store the custom script in the second memory device or execute the custom script in the telematics application.

15. The system of claim 1, wherein the electronic device is configured to receive the custom script from a device via a wireless communication network.

16. A method for gathering vehicle data from a vehicle computer installed in a vehicle and a plurality of sensors disposed about the vehicle and providing functionality for a third-party to install and then execute custom scripts within a telematics application to change default functionalities of the telematics application when processing the vehicle data, the method comprising:

under control of an electronic device comprising digital logic circuitry and installed in a vehicle, the electronic device comprising a port coupled with a vehicle computer installed in the vehicle and having wired or wireless connections with a plurality of sensors disposed about the vehicle:

while the vehicle travels a route, executing a telematics application causing the electronic device to gather vehicle data received from the vehicle computer or the plurality of sensors, determine vehicle events using the vehicle data, and transmit at least some of the vehicle data and at least some of the vehicle events to a vehicle management system, the telematics application retrieved from a first memory device;

subsequent to the vehicle traveling the route, receiving and storing in a second memory device a custom script executable in the telematics application, the telematics application being configured to interpret the custom script;

retrieving the custom script from the second memory device; and while executing the telematics application, executing the custom script in the telematics application to change a default functionality of the telematics application so that the telematics application causes the electronic device to control operation of a component associated with the vehicle differently than if the telematics application is executed without executing the custom script in the telematics application, wherein the component comprises a transmitter, and the custom script is executed in the telematics application to change the default functionality of the telematics application so that the telematics application causes the electronic device to control operation of the transmitter to complete a data service call.

17. The method of claim 16, further comprising:
under control of the electronic device:
subsequent to executing the custom script in the telematics application, executing the telematics application without executing the custom script in the telematics application so that the default functionality of the telematics application is not changed.

18. The method of claim 16, wherein when executing the custom script in the telematics application, the custom script receives the vehicle data from the telematics application rather than directly receiving the vehicle data from the vehicle computer and the plurality of sensors.

19. The method of claim 16, further comprising:
under control of the electronic device:
executing the custom script in the telematics application so that the telematics application performs a first operation not initiated by the custom script with a higher priority than a second operation initiated by the custom script.

* * * * *